3,334,846
ULTRASONIC CABIN ENCLOSURE MEANS
Walter A. Spivak and Frederick T. McQuilkin, Los Angeles, and Angelo P. Martignoni, Inglewood, Calif., assignors to North American Aviation, Inc.
Filed Nov. 27, 1964, Ser. No. 414,384
8 Claims. (Cl. 244—121)

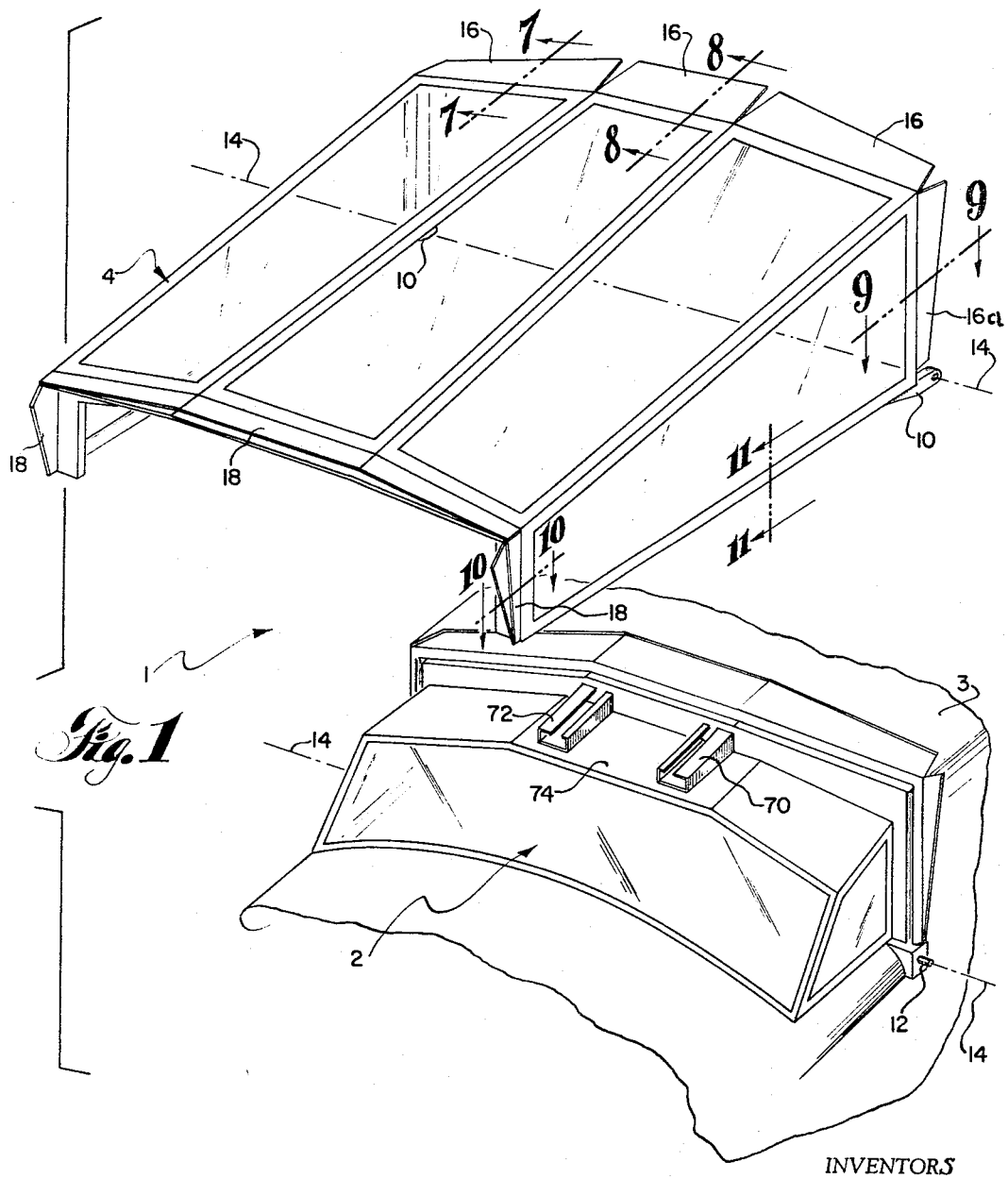

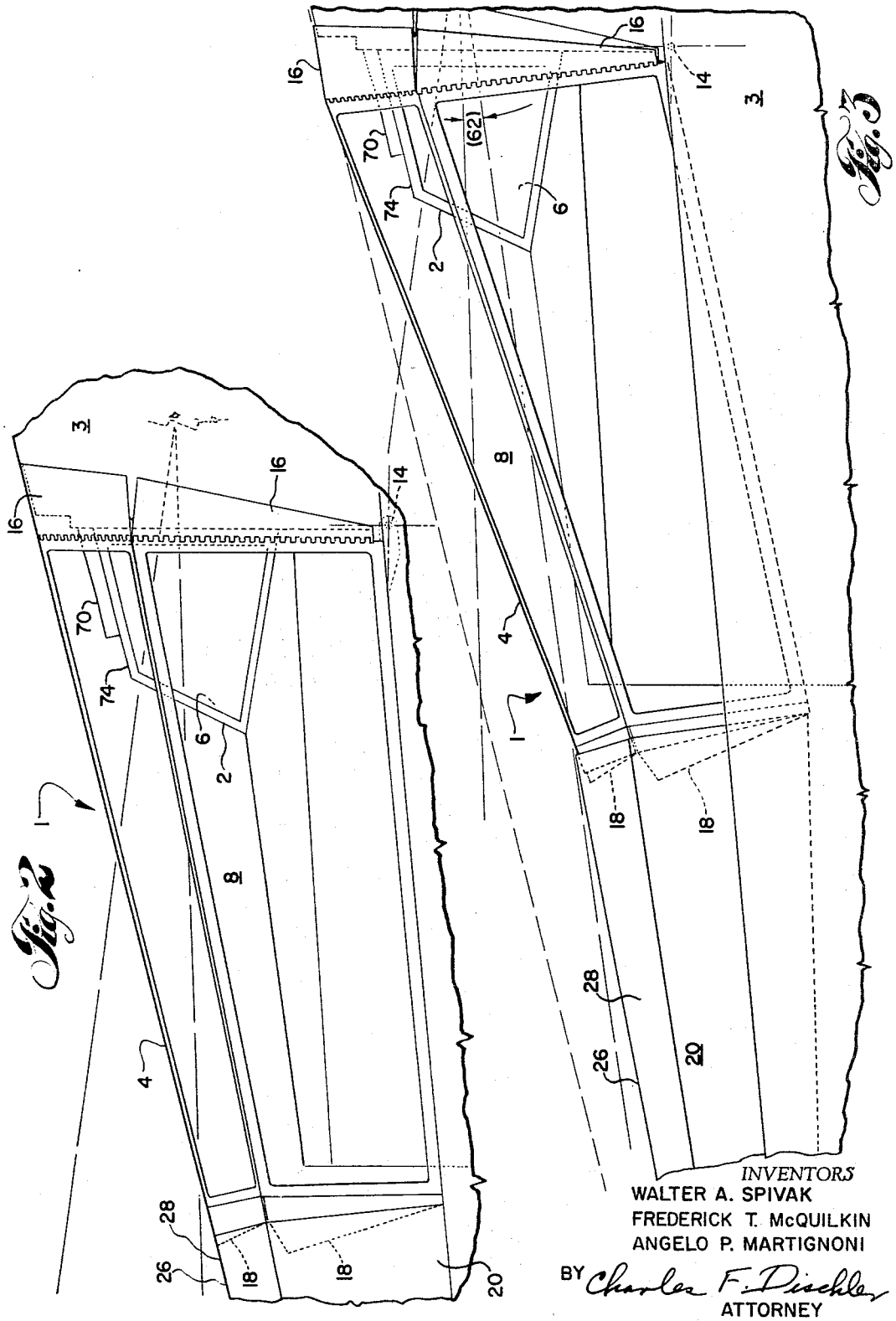

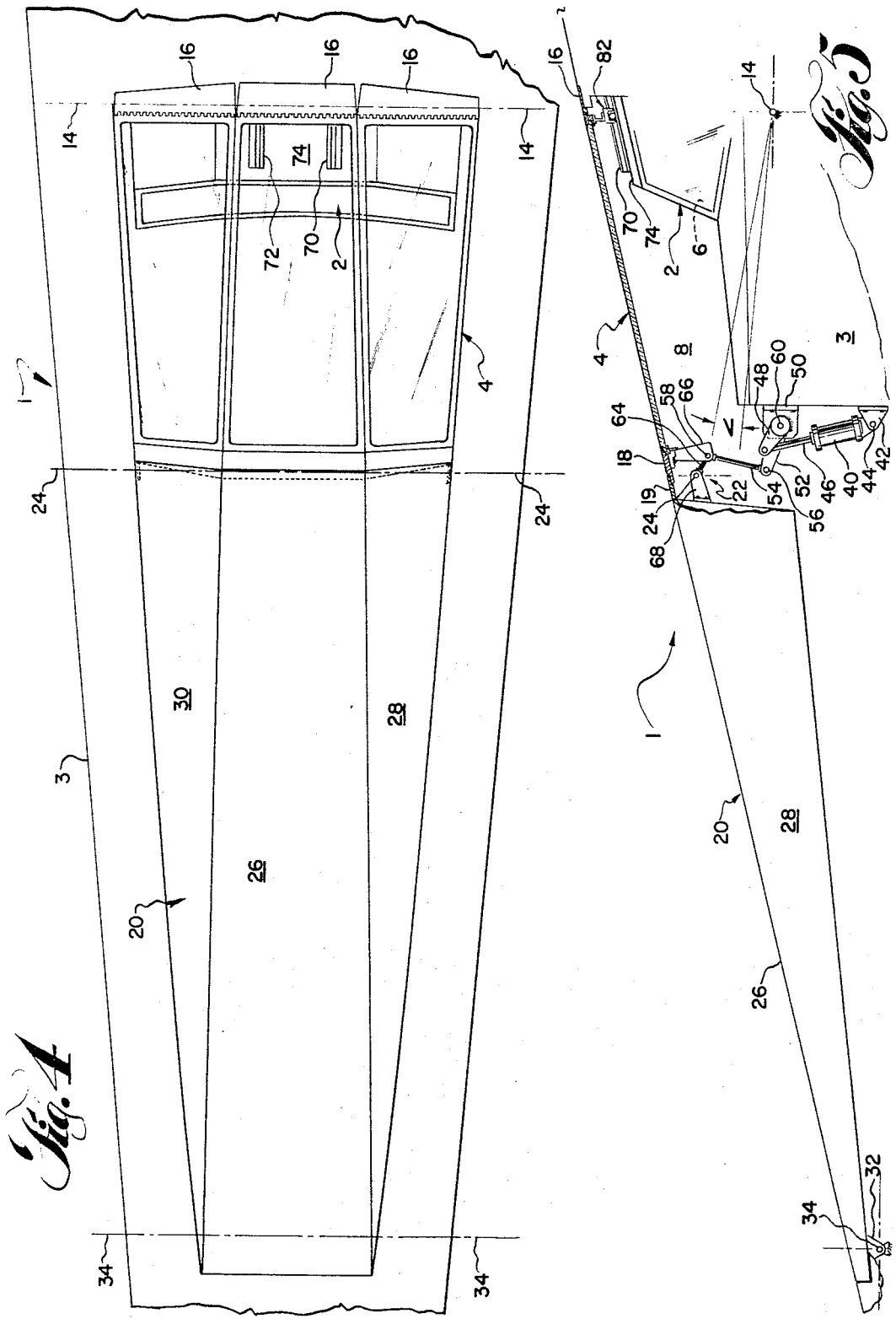

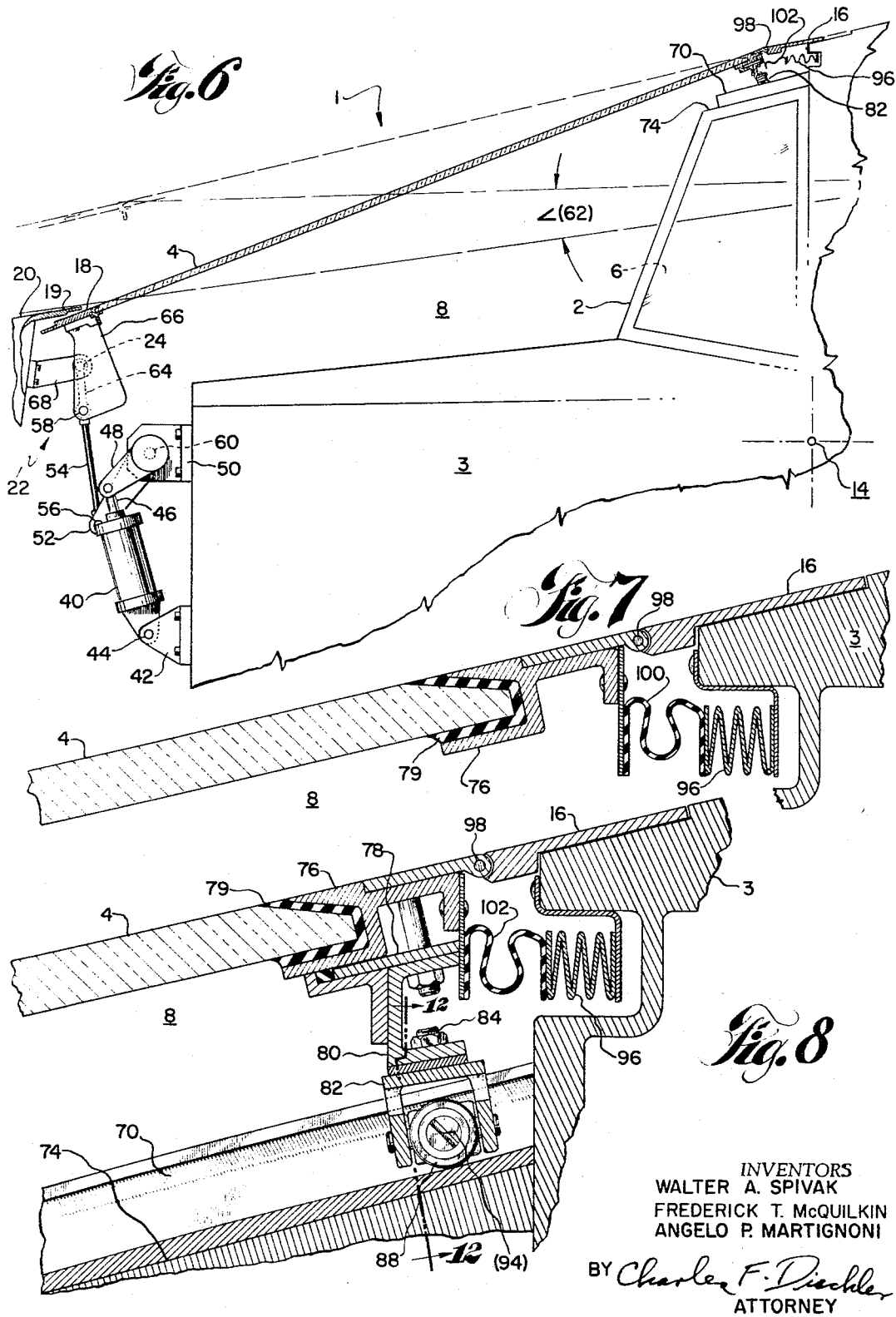

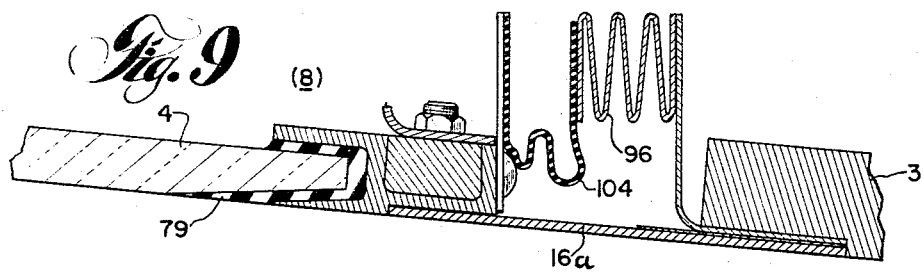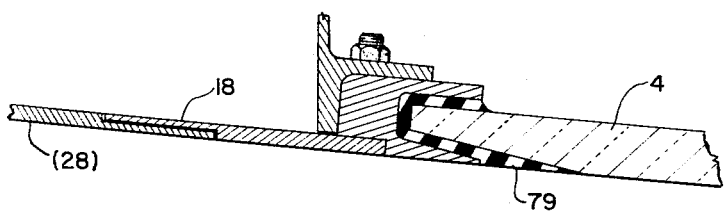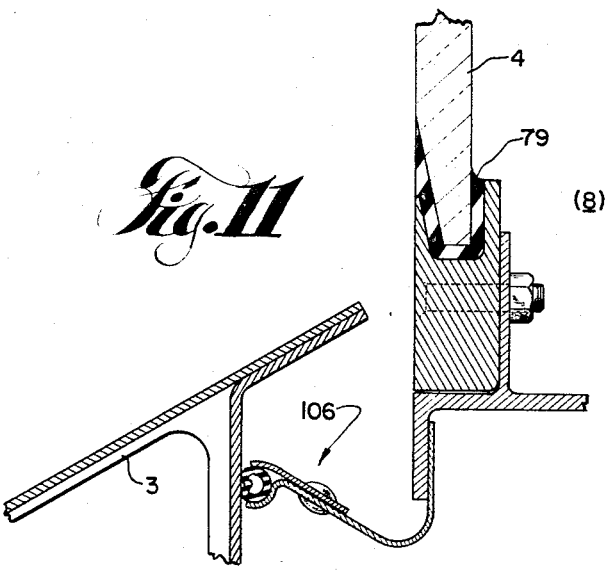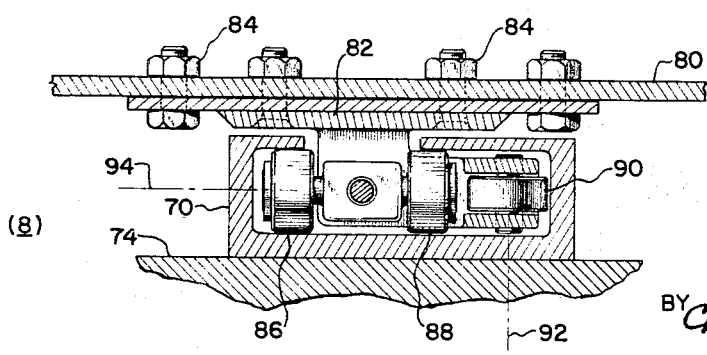

This invention concerns crew enclosure means particularly suitable for manned ultrasonic aerial vehicles wherein a minimum of resistance drag is crucially important for sustained operation, and visual observation of a landing surface is necessary or desirable for the crew during the landing of such vehicles. More particularly, this invention relates to transparent surfaces such as used to form windshields for pressurized crew compartments in vehicles of the stated type.

The invention disclosed herein is broadly applicable to structural panels subjected to external loading in a plurality of directions, in a wide variety of shapes or locations, and in any type of vehicle. However, a particular need for this invention exists in connection with pressurized cabins in ultra-high speed type aerial and space vehicles, wherein structures are exposed to extreme temperatures and stresses encountered during vehicle operation. Thus, where vehicle operation within the atmospheric envelope surrounding the earth is involved, air friction and impact effects may elevate vehicle surface temperatures in excess of 500° F., simultaneously with the application of pressures thereto resulting from the pressurization of the cabin or crew enclosure. The windshield in vehicles of the type mentioned above is normally provided with a rather gradual rearward slope for aerodynamic advantage, and also serves as a pressure barrier between the internal pressurized cabin area and the external atmosphere. Since any increase in the angle of windshield slope away from a vertical plane is necessarily accompanied by an increase in windshield surface area, greater length is required to accommodate the stated change of slope. Such increase in length of the transparent windshield surface would result in extremely severe bending loads imposed upon the panel material by pressurization of the cockpit or crew enclosure. Since the windshield in effect forms a wall of the pressurized crew enclosure and its external surface is exposed to ambient atmospheric conditions including the extreme low pressures occurring at high altitudes, differential pressure across the windshield during cockpit pressurization in the conventional arrangement imposes a considerable bending load on panels which form the same. It has been suggested in the prior art to increase the downward vision of the pilot during landing and takeoff by lowering or drooping the whole nose of the vehicle. However, such modification of the vehicle forebody increases the structural complexity thereof.

In an attempt to overcome the very considerable design problems mentioned above, a dual windshield arrangement has been found useful whereby a relatively vertical inner windshield assembly forms a pressure barrier for the crew enclosure, and an outer windshield generally aligned with the inner windshield forms an outer aerodynamic surface of the vehicle. However, the stated type of arrangement has been found inadequate to provide both an optimum aerodynamic configuration at ultrasonic speeds and sufficient visual range for observation of terrain during landing, tanker connections during in-flight refueling or other situations calling for high visibility.

Accordingly, it is a principal object in this case to provide an improved windshield structure for use in ultra high speed vehicles requiring severely sloped outer surfaces for aerodynamic continuity.

It is a further object of this invention to provide structure as set forth in the above object having improved optical qualities and optimum field of vision during landing.

It is an additional object in this case to provide structure as set forth in the above objects wherein an outer windshield is adapted for movement relative to an inner windshield to alter the aerodynamic configuration of such outer windshield with improved ease of fabrication, installation, operation and performance reliability, in addition to economy of weight and a minimum of the requisite forces to cause such movement.

It is another object in the instant case to provide improved mechanical means for moving a plurality of panels forming outer aerodynamic surface portions of a vehicle.

Other important objects and advantages of the instant invention will become apparent upon a close reading of the following detailed description of an illustrative embodiment of the invention, reference being had to the accompanying drawings, wherein:

FIG. 1 shows a general perspective view of a double windshield arrangement according to the inventive concept wherein the outer windshield assembly is shown separated from the inner windshield assembly for the sake of clarity;

FIG. 2 shows a side elevational view of the windshield of FIG. 1 with the components in operative relationship in a vehicle in the high-speed configuration;

FIG. 3 shows a view similar to FIG. 2 but with the windshield components in the landing or low speed configuration;

FIG. 4 shows a plan view of the overall windshield arrangement shown in FIGS. 2 and 3;

FIG. 5 shows a longitudinal view, partly in cross section, of the structure shown in FIG. 2, with portions of the structure omitted for the sake of clarity;

FIG. 6 shows the same structure as FIG. 5 but with the windshield in the low speed flight position, corresponding with the position shown in FIG. 3;

FIG. 7 shows an isolated cross-sectional view taken generally along line 7—7 in FIG. 1;

FIG. 8 shows an isolated cross-sectional view taken generally along line 8—8 in FIG. 1;

FIG. 9 shows an isolated cross-sectional view taken generally along line 9—9 in FIG. 1;

FIG. 10 shows an isolated cross-sectional view taken generally along line 10—10 in FIG. 1;

FIG. 11 shows an isolated cross-sectional view taken generally along line 11—11 in FIG. 1; and FIG. 12 shows an isolated cross-sectional view taken generally along line 12—12 in FIG. 8.

Referring to the drawings described above and particularly to FIG. 1, it may be seen that the invention in this case contemplates a windshield generally designated by reference numeral 1 and comprising inner windshield assembly 2 and outer windshield assembly 4 mounted on a vehicle 3. Inner windshield assembly 2 forms a wall portion of the pressurized cabin enclosure indicated by reference numeral 6 in FIG. 2, for example, adapted to accommodate human occupants, and adapted to isolate pressurized area 6 from an intermediate pressure area 8 formed between windshield assemblies 2 and 4, while windshield assembly 4 separates intermediate area 8 from the outer ambient atmosphere surrounding vehicle 3. Where vehicle 3 is an aerial or space vehicle, the outer surface of outer windshield assembly 4 forms a portion of the outer aerodynamic surface of such vehicle. During high altitude operation of vehicle 3, the pressure differential between area 6 and the ambient atmosphere surrounding vehicle 3 may be very substantial. However, inner windshield assembly 2 is stationary and permanently fixed to the vehicle, whereby no sliding or moving seals are required in inner assembly 2 to retain the cabin pressure. Outer windshield assembly 4 is mounted on vehicle 3 by suitable means such as bracket 10 and bearing support 12 for pivotal movement of assembly 4 about an axis 14 in a manner described in greater detail hereinbelow. Because the pressure in intermediate area 8 between assemblies 2 and 4 may normally coincide substantially with the outer ambient atmospheric pressure surrounding vehicle 3, the necessity for high pressure seals between outer assembly 4 and vehicle 3 is avoided in the arrangement disclosed herein. However, to minimize drag effects and maintain substantial aerodynamic continuity, sealing means 16, 16a and 18 are provided on the aft and forward edges, respectively, of windshield assembly 4 as shown, for example, in FIG. 1 and described further below.

Referring to FIGS. 2 and 4, it may be seen that outer windshield assembly 4 is operatively related to a relatively movable fairing surface portion 20 of the outer surface of vehicle 3 by an elongate transverse hinge assembly 22 connecting windshield assembly 4 at its forward edge to fairing surface 20 at its aft edge, in pivoting relationship about multiple pivot axes 24 and 58 as seen in FIGS. 4 and 5. The folding ramp or movable fairing surface 20 functions to minimize drag effects by improving the aerodynamic continuity of the outer surface of vehicle 3. Fairing 20 generally comprises a center panel 26 integrally joined or otherwise affixed to identical and oppositely facing side portions 28 and 30 as seen more particularly from FIG. 4. Center panel 26 of ramp 20 is further pivoted at the forward edge thereof to vehicle 3 by one or more hinges 32, whereby ramp 20 is pivotally movable relative to vehicle 3 about a pivot axis 34 as seen in FIG. 5. Due to the four stated pivot axes 14, 24, 58, and 34 described above, it may be seen that outer windshield assembly 4 and aerodynamic fairing or ramp 20 may be moved relative to stationary inner windshield assembly 2 and vehicle 3 between the two extreme positions shown by comparison of FIGS. 2 and 3 by the application of force by appropriate means acting at the hinge axis 58 common to both stated pivotal items. Moreover, sealing means 18 on the forward edge of assembly 4 is operatively related to oppositely facing sealing means 19 on the aft edge of fairing 20 and adapted to contact the same both in the high speed and low speed positions of the windshield as discussed in greater detail below.

Referring to FIGS. 5 and 6, it may be seen that force means for causing movement of outer windshield assembly 4 and fairing member 20 may illustratively comprise a pressurizable cylinder 40 pivotally mounted on a bracket 42 affixed to vehicle 3 for limited rotation about a pivot axis 44. Cylinder 40 may comprise actuator means of any well-known type including a double acting piston (not shown) connected to an output shaft 46 movable in two opposite directions generally along its longitudinal axis. Output shaft 46 may be pivotally attached at its outer distal end to one arm 48 of a bellcrank pivotally secured on a bracket 50 affixed to vehicle 3, while the other arm 52 of the stated bellcrank is secured to an intermediate link 54 by a pivot 56 at one end thereof. The opposite end of link 54 is pivotally secured to a bracket 66 or other suitable structure at the forward edge of windshield assembly 4 by a pivot 58 as suggested by FIG. 5. Thus, force developed within actuator means 40 may move output shaft 46 upwardly or downwardly substantially along its longitudinal axis whereby the bellcrank comprising arms 48 and 52 is rotated about common pivot axis 60 through bracket 50, moving link 54 and applying force in a generally vertical direction to the forward edge of outer windshield assembly 4 through bracket 66 affixed thereto.

Application of force by movement of output shaft 46 in the stated manner to raise or lower the forward edge of outer windshield assembly 4 causes rotational movement of assembly 4 about rotational axis 14 described above in connection with FIG. 1, for example. FIG. 6 shows the position of outer windshield 4 with the forward edge thereof lowered as accomplished for greater visibility during landing, with the high speed configuration of the windshield indicated by dashed lines in the same figure, whereby it may be seen that the field of forward vision of a pilot or observer within pressurized enclosure 6 is increased by the angle designated by reference numeral 62 in FIG. 6 when the windshield is in the landing or maximum visibility configuration.

It may further be seen from FIGS. 5 and 6, for example, that force applied to pivot axis 58 is transmitted by one or more idler links 64 to bracket 68, one or more of which are affixed to fairing panel 26 at or near the aft edge thereof. Idling link 64 is sized and arranged to perform a very significant function in the arrangement disclosed herein. Specifically, it will be understood that pivot axis 58, due to its location on bracket 66 affixed to assembly 4 can move only in a circular path defined by a center of rotation coinciding with pivot axis 14 which pivotally supports assembly 4 on vehicle 3. Pivot axis 24, due to its location on bracket 68 affixed to fairing 20, can move only in a circular path defined by a center of rotation coinciding with pivot axis 34. Since the turning radius between axes 14 and 58 is substantially less than the turning radius between axes 32 and 24, and because of the relative positions of pivots 24 and 58, it may be seen from FIG. 5 that movement of link 54 under the force of actuator 40 to lower outer windshield assembly 4 will cause immediate separation of sealing member 18 away from sealing member 19, since the rate of downward movement of bracket 66 is necessarily greater than the rate of downward movement of bracket 68. The stated separation of sealing edge members 18 and 19 will be maintained at all times during relative movement between assembly 4 and fairing 20, until the precise moment when windshield assembly 4 attains the low speed position shown in FIG. 6, at which time edge member 19 will lightly contact edge member 18 in overlapping relationship. Conversely, when generally upward force is applied by actuator 40 to raise windshield assembly 4 from the position shown in FIG. 6 into its high speed position, initial movement of link 54 on idling link 64 will cause immediate separation of edge member 19 away from edge member 18 due to pivotal rotation of link 64 about axis 58, whereby pivot axis 24 moves slightly toward the left as seen in FIG. 6. The foregoing operational features will be understood to result from the basic configuration of a four-link kinematic system. As applied to the structure described above, the four basic links of the present system consist of vehicle 3, fairing 20, link 64 and assembly 4, as seen most clearly from the view shown in FIG. 5. The dimensional and kinematic relationship between the four basic links in the present case results in contact between items 18 and 19 only when fairing 20 and assembly 4 are in their two operative positions, specifically the positions shown in FIGS. 5 and 6, respectively. In all intermediate positions during transition between the high and low speed configurations of the fairing and windshield, edge members 18 and 19 are separate from each other, whereby no scraping, binding or jamming of the edges against each other is possible. Moreover, separation of members 18 and 19 occurs immediately when movement of link 54 begins to change the windshield from one operative position to the other, and before any substantial pivoting of fairing 20 occurs about axis 34 or of assembly 4 occurs about axis 14. The structural relationship thus established between both items further insures that precise aerodynamic integrity will be achieved at both the high and the low speed configurations, since close and intimate contact of edge member 19 with member 18 necessarily occurs in every instance when one or the other extremes of windshield movement is reached.

It may further be seen from FIGS. 5, 8 and 12 that means are provided in the windshield arrangement disclosed herein for supporting the aft edge of outer windshield assembly 4 in a manner permitting continuous support at such edge during relative movement of outer assembly 4 with respect to vehicle 3. The stated support means include a plurality of elongate guide members or tracks which consist of two tracks 70 and 72 lying on a radius about pivot 14 and affixed on a roof portion 74 of inner windshield assembly 2. The aft edge of outer windshield assembly 4 is provided near the center thereof with a channel member 76 as seen in FIG. 8 permanently secured to the stated edge by suitable cushioning and adhesive compound 79. Member 76 is provided with suitable flange or other support means such as indicated by reference numerals 78 and 80 in FIG. 8, for example to which a pair of trolley or roller supports 82 may be secured by holding means 84 seen more particularly in FIG. 12. Roller supports 82 are adapted to receive and support a plurality of track following means or rollers 86, 88 and 90 as shown in FIG. 12, wherein the stated rollers engage track 70 in rolling contact therewith. Rollers 86 and 88 rotationally mounted upon roller support 82 provide generally vertical stability and support for outer windshield assembly 4, while generally horizontal roller 90 provides lateral support and stability due to its rotational axis 92 being substantially normal to the rotational axis 94 of rollers 86 and 88. Thus, it may be seen that movement of the aft edge of outer windshield assembly 4 relative to vehicle 3 may occur in a generally fore and aft direction by movement of rollers 86 and 88 within tracks 70 and 72 during changes of position of outer windshield assembly 4 from the high speed to the landing configuration shown in FIGS. 2 and 3.

As also shown in FIG. 8, for example, suitable sealing means sufficient to form a low pressure differential and relatively flexible seal are provided between the aft edge of outer windshield 4 and vehicle 3 and may illustratively comprise a flexible bellows type sealing element 96 secured on one side thereof to vehicle 3 and on the other side to a flexible sealing material or fabric 102 which may in turn be secured to any conveniently presented structural surface along the aft edge of outer windshield assembly 4. Also, external surface covering means in the form of plate 16 may be seen in FIGS. 7 and 8 having a pivotal connection with the aft edge portion of outer windshield assembly 4 which may take the form of a hinge pin 98 permitting slight movement of plate 16 relative to vehicle 3 to maintain substantially continuous aerodynamic continuity between outer windshield assembly 4 and vehicle 3 throughout the entire range of relative movement of the windshield during change of position from the high to the low speed configuration. Referring to FIGS. 7, 9 and 11, it may be seen that a bellows type member or other flexible seal indicated by reference numerals 96, 100, 102 and 104, respectively, may be supported and arranged to seal the side and aft portions of outer windshield assembly 4 along the edges thereof close to vehicle 3 in the same manner as sealing member 96 discussed above.

FIG. 10 shows the operative interengagement of side edge sealing panels 18 and 28 wherein close contact between the surfaces thereof maintains aerodynamic continuity in the surface of vehicle 3 during and throughout the range of relative movement of fairing 20 and windshield assembly 4 to which panel 18 is affixed as shown.

FIG. 11 shows suitable sealing means between the lower side edge of assembly 4 and vehicle 3 which may take the form of a flexible member 106 secured by any appropriate means such as adhesives or riveted clamps to the windshield lower edge portion in sliding contact with vehicle 3.

From the description set forth above, it may be seen that the novel windshield arrangement disclosed herein permits avoidance of excessive aerodynamic heating and minimum drag during high speed vehicle operation within the atmospheric envelope of the earth, while permitting high visibility when necessary such as during in-flight refueling, direct visual contact with military targets, landing operation or other situations when high visibility becomes of primary importance. The beneficial results and advantages of the windshield arrangement disclosed herein do not involve severe weight penalties or relatively high actuating forces, since outer windshield assembly 4 and ramp or fairing 20 represent a relatively small portion of the total exterior surface of vehicle 3 and do not comprise a large mass. Accordingly, the hinge moments or loads on pivot means 10, 12 or 32 are relatively small and the actuating means such as cylinder 40 and related linkage may be relatively simple, compact and lightweight. Moreover, the change in aerodynamic or flight characteristics in vehicle 3 are not drastically altered by movement of windshield 4 and ramp 20 from the high speed to the low speed configuration, in contrast with some conventional design approaches which involve movement or an entire nose or fuselage portion of a vehicle to permit increased visibility, requiring rapid and drastic corrections in aerodynamic trim and engine power, with consequent dangers associated with such complex operational procedures.

While the particular details set forth above and in the drawings are fully capable of attaining the objects and providing the advantages herein stated, the precise methods and structures thus disclosed are merely illustrative and could be varied or modified to produce the same results without departing from the scope of the inventive concept as defined in the appended claims.

We claim:
1. An articulated windshield structure forming a portion of the outer surface of a vehicle comprising:
    a windshield panel and an adjacent fairing surface,
    said windshield structure being pivotally connected to said vehicle at its distal edges,
    pivotal link means including at least one intermediate link interconnecting said windshield panel and said fairing surface near their adjacent edges, and
    a force generating means connected to said intermediate link for changing the relative angle between said windshield panel and said fairing surface.
2. In a transparent windshield structure for permitting forward visibility in a vehicle:
    a windshield panel forming a portion of the outer surface of said vehicle and pivotally mounted on said vehicle for pivotal movement between a first position and a second position,
    a movable fairing surface forming another portion of the outer surface of said vehicle pivotally mounted on said vehicle for pivotal movement between a first position and a second position, and
    means operatively connecting said panel and said fairing surface for causing movement of said fairing surface from its first position to its second position automatically when said windshield panel is moved from its first position to its second position, said means including at least one intermediate link having one end thereof pivotally secured to said panel and the other end thereof pivotally secured to said fairing surface so that said fairing surface and said windshield panel may move in unison but at different rates between their respective first and second positions.

3. In a transparent windshield structure for permitting forward visibility in a vehicle:
   a windshield panel forming a portion of the outer surface of said vehicle and pivotally mounted on said vehicle for pivotal movement between a first position of least aerodynamic drag and limited forward visibility, and a second position of relatively greater aerodynamic drag and greater forward visibility,
   a movable fairing surface forming another portion of the outer surface of said vehicle and pivotally mounted on said vehicle for pivotal movement between a first position and a second position,
   means operatively connecting said panel and said fairing surface for causing movement of said fairing surface from its first position to its second position automatically when said windshield panel is moved from its first position to its second position, and
   an inner windshield spaced apart from said outer surface windshield panel and aligned therewith for visual observation through both, said inner windshield forming a pressure barrier for a pressurized crew compartment in said vehicle.

4. In a transparent windshield for a high speed aerial vehicle:
   a windshield panel forming part of the aerodynamic surface of said vehicle,
      said panel having a forward edge and an aft edge,
   first support means for supporting said panel on said vehicle, said first support means including a pivotal support connecting said panel to said vehicle for pivoting movement of said panel about a first axis relative to said vehicle,
   collapsible elongate fairing means forming a portion of said vehicle aerodynamic surface forward of said windshield panel,
      said fairing means having a forward edge and an aft edge,
   second support means for supporting said fairing means on said vehicle for pivoting movement of said fairing means about a second axis relative to said vehicle,
   pivot connection means including at least one intermediate link pivotally connecting said aft edge of said fairing means to said forward edge of said windshield panel, and
   force means connected to said intermediate link for pivoting said panel and said fairing means about said first and second axes, respectively, by applying force to said link to alter the relative position of said outer aerodynamic surface formed by said panel and said fairing means.

5. In a transparent windshield for a high speed aerial vehicle:
   an inner windshield assembly comprising at least one transparent panel forming a pressure barrier for a pressurized crew enclosure,
   an outer windshield assembly comprising at least one elongate transparent panel separated from said inner windshield panel by an air gap,
      said outer windshield assembly forming a portion of the outer aerodynamic surface of said vehicle,
   support means for supporting said outer windshield assembly for movement relative to said vehicle,
      said support means including first pivot means for pivoting said outer windshield relative to said vehicle about a first pivot axis,
   fairing means including at least one elongate panel forming a portion of the outer aerodynamic surface of said vehicle,
   second pivot means supporting said fairing means panel at a forward edge thereof and permitting pivotal movement of said fairing means panel relative to said vehicle, and
   intermediate link means connecting said fairing means panel to said outer windshield panel for pivotal movement of both said panels about their respective first and second pivot means.

6. In a windshield for a high speed aerial vehicle:
   a windshield panel forming part of the aerodynamic surface of said vehicle,
      said panel having a forward edge and an aft edge,
   first support means including a pivotal support connecting said panel to said vehicle for pivoting movement of said panel between two extreme positions of movement about a first axis relative to said vehicle,
   collapsible elongate fairing means forming a portion of said vehicle aerodynamic surface forward of said windshield panel,
      said fairing means having a forward edge and an aft edge,
   second support means for supporting said fairing means on said vehicle for pivoting movement of said fairing means about a second axis relative to said vehicle,
      said second axis being proximate said forward edge of said fairing means,
   force link means including an intermediate link for applying force to said forward edge of said windshield panel to cause said pivoting movement about said first axis,
   first pivot connection means for pivotally connecting said intermediate link at one end thereof to said forward edge of said windshield panel,
   idling link means including an elongate idling link pivotally connected at one end to said forward edge of said windshield panel,
   second pivot connection means for pivotally connecting the other end of said idling link to said aft edge of said fairing panel, and
   force generating means connected to said intermediate link for applying force to said link to cause movement of said windshield panel about said first axis and simultaneous movement of said fairing means about said second axis.

7. The structure set forth in claim 6 above, wherein:
   the distance between said first axis and said first pivot connection means is substantially less than the distance between said second axis and said second pivot connection means, and
   said aft edge of said fairing means overlaps said forward edge of said windshield panel to make sealing contact therebetween at both said extreme positions of movement.

8. In a transparent windshield structure for permitting forward visibility in a vehicle:
   a windshield panel forming a portion of the outer surface of said vehicle and pivotally mounted on said vehicle for pivotal movement between a first position of least aerodynamic drag and limited forward visibility, and a second position of relatively greater aerodynamic drag and greater forward visibility,
   a movable fairing surface forming another portion of the outer surface of said vehicle and pivotally mounted on said vehicle for pivotal movement between a first position and a second position,
   means operatively connecting said panel and said fairing surface for causing movement of said fairing surface from its first position to its second position automatically when said windshield panel is moved from its first position to its second position,
   said windshield panel forming a substantial rearward continuation of said movable fairing surface, and
   said movable fairing surface being pivotally mounted at its forward edge and said windshield panel being pivotally mounted at its aft edge with the adjacent aft edge of fairing surface and forward edge of the windshield panel being reversibly movable inwardly about their individual pivots from a first substantially continuous planar position to a second position wherein said fairing surface and said windshield panel are angularly disposed relative to each other.

References Cited

UNITED STATES PATENTS 2,142,997 1/1939 Case _____ 244—121
3,114,526 12/1963 Morgan _____ 244—120

OTHER REFERENCES

Aircraft Engineering, November 1963, TS501 A55, page 329.

FERGUS S. MIDDLETON, *Primary Examiner.*

ALFRED E. CORRIGAN, MILTON BUCHLER,
*Examiners.*